Patented Mar. 25, 1947

2,418,093

UNITED STATES PATENT OFFICE 2,418,093

REACTION BETWEEN HYDROGEN CHLORIDE AND ISOBUTYLENE

Ralph P. Perkins and Raymond H. Rigterink, Midland, Mich., assignors to The Dow Chemical Company, Midland, Mich., a corporation of Michigan No Drawing. Application August 5, 1944, Serial No. 548,322

4 Claims. (Cl. 260—663)

This invention concerns a method for the catalytic selective reaction of hydrogen chloride with isobutylene in the presence of butadiene and other hydrocarbons of the C4 series, i. e., those containing 4 carbon atoms to the molecule.

It is known that hydrogen chloride will selectively react with isobutylene to form tertiary butyl chloride without a catalyst at −70° C. in the presence of alpha- and beta-butylenes and that this reaction is instantaneous and complete. It is also known that the vapor phase reaction between hydrogen chloride and isobutylene will take place in the presence of catalysts. The vapor phase reaction is selective when a hydrocarbon mixture containing a predominant amount of isobutylene and minor amounts of paraffinic hydrocarbons and mono-olefines such as methane, ethane, propane, ethylene, propylene, etc., is treated with hydrogen chloride over a catalyst such as SbCl3, BiCl3, or kaolin. However, it also is known that butadiene reacts readily with hydrogen chloride at room temperature forming polymers and addition products. The reaction between hydrogen chloride (conveniently in aqueous solution) and a mixture of hydrocarbons containing tertiary base olefins, secondary base olefins, diolefins, small amounts of saturated hydrocarbons, and sometimes acetylenes is described in U. S. Patent 1,790,519 which teaches that the HCl reacts at temperatures preferably in the vicinity of 4° C. upon both the tertiary base olefins and other hydrocarbons more unsaturated than these olefins, leaving the secondary base olefins and saturated hydrocarbons unreacted.

It is an object of this invention selectively to react hydrogen chloride with the isobutylene in a mixture of isobutylene- and butadiene-containing hydrocarbons of the C4 series. Another object is to provide a method for the selective removal of isobutylene from a mixture of hydrocarbons of the C4 series, which mixture contains butadiene and may also contain butanes and other butenes, to produce tertiary butyl chloride in readily purifiable form. These and other objects will be apparent from the more detailed description which follows.

Although hydrogen chloride is known to react with butadiene at room temperature to form polymerization products and chlorobutenes, we have found that we can selectively react anhydrous HCl with isobutylene in the presence of butadiene, n-butenes, and other hydrocarbons containing 4 carbon atoms in the molecule to form tertiary butyl chloride. Very little, if any, of the hydrocarbons other than isobutylene are consumed in the reaction. The reaction between hydrogen chloride and isobutylene takes place selectively when carried out in liquid phase at temperatures between 10° and 50° C., preferably at about 30° C., in the presence of a catalyst consisting of a bleaching clay. The term "bleaching clay" refers to a naturally occurring argillaceous material, which, at least after being activated by treatment with a mineral acid such as sulfuric acid, possesses a color-removing action toward discolored organic compounds. In some instances, the bleaching clays possess such color-removing action without being acid-activated. Examples of clays, suitable for use as contact agents by reason of their favoring a high conversion of isobutylene and little or no side reaction, are those known commercially as Floridin, Evans clay, "General" bleaching clay (clay from the General Reduction Company of Macon, Georgia), bentonite, fuller's earth, Activite, Chloro-Flo and Retrol. Floridin, Evans clay, and "General" bleaching clay are particularly effective for the purpose.

Our process may be conducted in batch, intermittent, or preferably, in continuous fashion. The contact between the reagents and the catalyst is effected in the liquid phase in any suitable manner; e. g., (a) the gaseous or liquid mixture of hydrocarbons mixed with anhydrous HCl may be passed through a column packed with the catalyst counter-current to downward flowing liquid hydrocarbons, or (b) a similar mixture of hydrocarbons and anhydrous HCl may be bubbled through a suspension of the catalyst in tertiary butyl chloride or other suitable liquid, or (c) anhydrous HCl may be pumped into a suspension of the catalyst in a liquid mixture of the C4 hydrocarbons being treated. The HCl is usually employed in amount sufficient to react with the isobutylene present, preferably in about the stoichiometric proportion. It reacts to form substantially pure or easily purifiable tertiary butyl chloride. The use of a greater amount of HCl produces substantially the same result. The use of HCl in less than the stoichiometric amount with respect to isobutylene effects the same selective reaction, but, of course, does not effect complete removal of the isobutylene from the mixture of C4 hydrocarbons.

The following examples describe certain ways in which the principle of the invention has been applied but are not to be construed as limiting the invention.

Example 1

The composition of the hydrocarbon mixture, or C₄ stock used as a starting material, was as follows:

| | Per cent |
|---|---|
| Isobutylene | 12.6 |
| Butadiene | 1.8 |
| n-Butenes | 83.8 |
| Inerts and saturated C₄'s | 1.8 |

A 6-foot vacuum-jacketed glass column of one inch diameter, one-half of which was packed with Floridin of 4–8 mesh particle size, was placed above a 5 plate glass bubble cap column of one inch diameter. The bubble cap column was connected at its lower end to a boiling flask. Anhydrous HCl was fed into this apparatus at a point between the two columns until the Floridin became saturated. A mixture of the C₄ hydrocarbons and gaseous HCl was then fed into the apparatus at the same point. Tertiary butyl chloride, formed during operation in such manner, collected in the flask where it was boiled and caused to reflux in the lower of the two columns. Vapors containing unreacted C₄ hydrocarbons flowed from the upper column to a condenser, cooled with solid carbon dioxide, where condensation of the hydrocarbons took place. Approximately half of the hydrocarbon condensate was withdrawn and half was returned to the upper column for the purpose of reflux. Such operations were continued until the packing in the upper column was wet with the condensate and a condition of balance between the materials flowing to and from the apparatus had been established. Thereafter, the boiling flask was emptied and the apparatus was operated for 1½ hours under the following conditions: C₄ hydrocarbon charging rate, 186 grams per hour; HCl flow, approximately 15 grams per hour; head temperature, −4° to −6° C.; and pot temperature, 51° to 52° C.

The vent gas weighed 222 grams and was found to contain 0.2 per cent isobutylene, 1.6 per cent butadiene, 96.4 per cent n-butenes and 2.0 per cent inert and saturated materials. 60.8 grams of crude tertiary butyl chloride were recovered. This gave upon distillation:

| | Grams |
|---|---|
| Low boilers and loss up to 40° | 1.4 |
| Tertiary butyl chloride 40°–53° C. (mostly 51°–53° C.) | 56.2 |
| Residue | 3.2 |

Conversion of the isobutylene was 98.7 per cent, and the yield of tertiary butyl chloride based on the isobutylene converted was 98.0 per cent.

Example 2

A glass pot, 1½ inches in diameter by about 12 inches in height and fitted with a feed tube reaching to its bottom, was attached to the lower end of a 1 inch by 6 foot vacuum-jacketed glass column packed with ¼ inch Berl saddles. The head of this column was fitted with a reflux condenser which was cooled with solid carbon dioxide and was arranged for a 1:1 reflux ratio. 45 grams of "General" bleaching clay and 153 grams of tertiary butyl chloride were placed in the pot to give a liquid depth of about 10 inches.

C₄ charging stock, of the composition given in Example 1, and anhydrous HCl were fed to the pot for a period of two hours, while the temperature of the pot was maintained at 20° to 35° C. The rate at which the C₄ hydrocarbons were fed to the pot was 186 grams per hour and the rate of feed for the HCl was approximately 15 grams per hour.

Liquid was withdrawn from the column at a point just above the pot to keep the level in the pot approximately constant. At the end of the run the vent gases were analyzed, and the crude tertiary butyl chloride obtained from the base of the column and by filtering the pot contents was distilled.

The vent gas weighed 292 grams and was found to contain 1.2 per cent isobutylene, 1.6 per cent butadiene, 95.4 per cent n-butenes, and 1.8 per cent inert and saturated materials.

A substantially pure tertiary butyl chloride distillate weighing 223.4 grams and a residue weighing 2.6 grams were obtained by distilling the crude tertiary butyl chloride and collecting the fraction which boiled within the range of 40.0° to 53.5° C., practically all of said fraction having a boiling point of about 50.0° C. Of the total weight of the distillate, 70.4 grams were formed in the reaction.

The conversion of isobutylene was 92.5 per cent and the yield of tertiary butyl chloride, based on the isobutylene consumed, was 98.3 per cent.

Example 3

The apparatus used in this example was the same as that used in Example 2. "General" bleaching clay was used as a catalyst. The composition of the C₄ charging stock was as follows:

| | Per cent |
|---|---|
| Isobutylene | 29.0 |
| Butadiene | 18.0 |
| n-Butenes | 19.8 |
| Inerts and saturated C₄'s | 33.2 |

The C₄ charging stock and anhydrous HCl were fed into the pot for a period of 5 hours, while the temperature of the pot was held at 30° to 35° C. The rate at which the C₄ hydrocarbons were fed to the pot was 151 grams per hour and the rate of feed for the HCl was approximately 43 grams per hour. The reaction was carried out and measurements were taken as in Example 2.

The vent gas weighed 530.4 grams and was found to contain 2.6 per cent isobutylene, 24.0 per cent butadiene, 24.8 per cent n-butenes, and 48.6 per cent inert and saturated materials.

The yield of tertiary butyl chloride from the reaction was 327.2 grams. The conversion of the isobutylene was 93.7% and the recovery of the tertiary butyl chloride, based on the isobutylene converted, was 96.5%.

Other modes of applying the principle of our invention may be employed, change being made as regards the method herein disclosed, provided the step or steps stated by any of the following claims or the equivalent of such stated step or steps be employed.

We therefore particularly point out and distinctly claim as our invention:

1. The method for selectively reacting hydrogen chloride with the isobutylene in a mixture of isobutylene- and butadiene-containing hydrocarbons of the C₄ series which comprises treating the mixture in the liquid phase with anhydrous hydrogen chloride in the presence of a bleaching clay and at a temperature of from about 10° to about 50° C.

2. The method for selectively reacting hydrogen chloride with isobutylene in a mixture of isobutylene- and butadiene-containing hydrocarbons of the C₄ series which comprises mixing the hydrocarbon composition with anhydrous hydrogen chloride and passing the mixture counter-current to a liquid hydrocarbon reflux through a column packed with a catalyst consisting of a bleaching clay, while maintaining a temperature in the reaction zone of from about 10° to about 50° C.

3. The method for selectively reacting hydrogen chloride with isobutylene in a mixture of isobutylene- and butadiene-containing hydrocarbons of the $C_4$ series which comprises adding anhydrous hydrogen chloride to the hydrocarbon mixture in liquid phase in which there is maintained a suspension of a catalyst consisting of a bleaching clay, at a temperature in the reaction zone of from about 10° to about 50° C.

4. The method for selectively reacting hydrogen chloride with isobutylene in a mixture of isobutylene- and butadiene-containing hydrocarbons of the $C_4$ series which comprises adding anhydrous hydrogen chloride together with said hydrocarbon mixture to a liquid tertiary butyl chloride suspension of a catalyst consisting of a bleaching clay, at a temperature in the reaction zone of from about 10° to about 50° C.

RALPH P. PERKINS.
RAYMOND H. RIGTERINK.

REFERENCES CITED

The following references are of record in the file of this patent:

UNITED STATES PATENTS

| Number | Name | Date |
|---|---|---|
| 1,790,519 | Davis | Jan. 27, 1931 |
| 2,069,624 | Prutton et al. | Feb. 2, 1937 |
| 2,156,070 | Stern | Apr. 25, 1939 |
| 2,181,642 | McMillan | Nov. 28, 1939 |
| 2,366,315 | Craig | Jan. 2, 1945 |

FOREIGN PATENTS

| Number | Country | Date |
|---|---|---|
| 344,592 | Britain | Mar. 12, 1931 |
| 361,041 | Germany | Oct. 9, 1922 |

OTHER REFERENCES

Chemical abstracts, vol. 30, col. 6702 (1936) Abstract of article by Dobryanskii et al.

Chemical abstracts, vol 31, col. 1004 (1937) abstract of article by Rudkovskii, et al.

Ellis, "Chemistry of Petroleum Derivatives," vol. I, page 328. (Copy in Div. 6.)